Patented Mar. 19, 1935

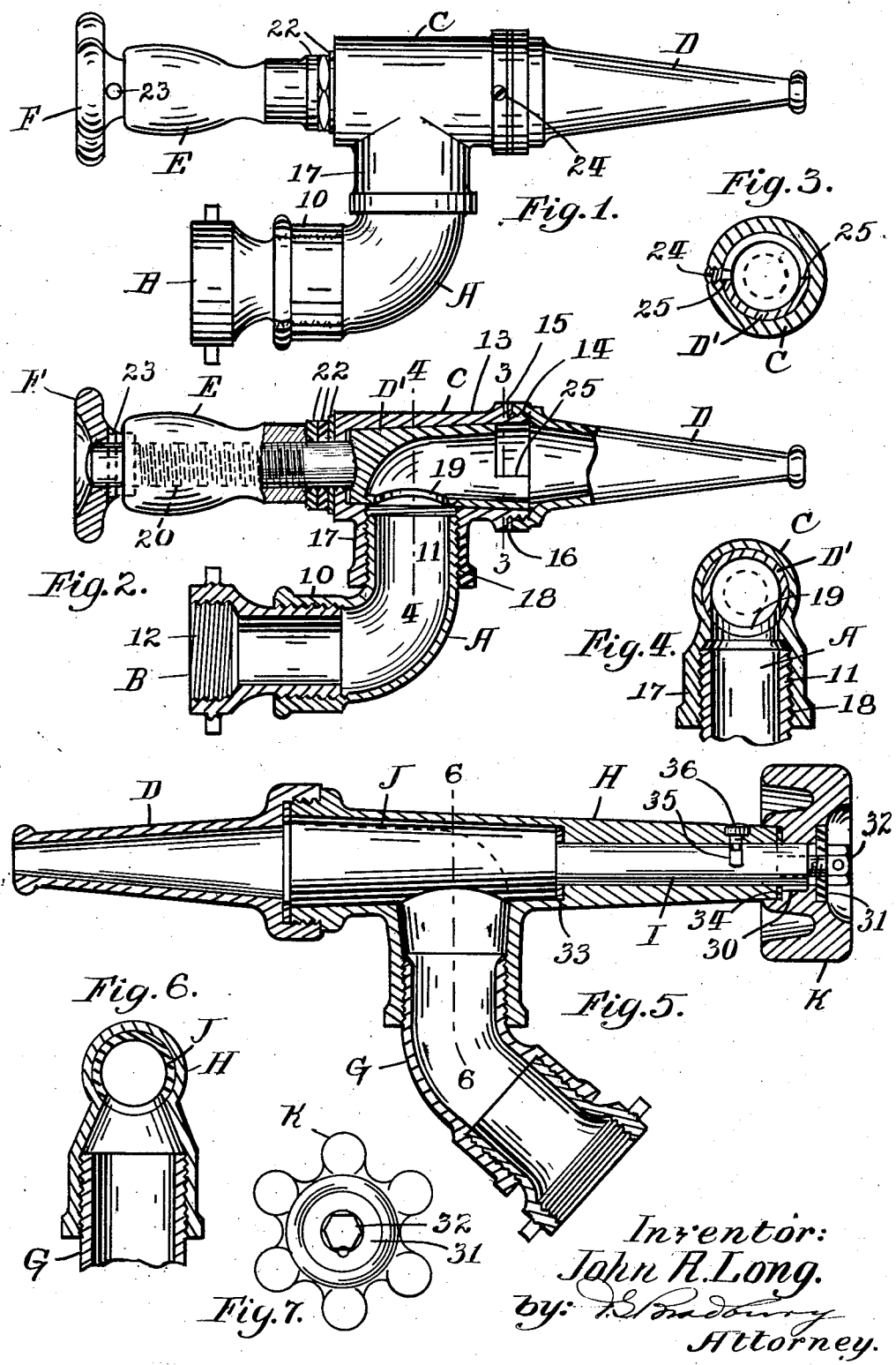

1,995,033

UNITED STATES PATENT OFFICE 1,995,033

UNIVERSAL FIRE HOSE COUPLING

John R. Long, Los Angeles, Calif.

Application September 18, 1933, Serial No. 689,928

3 Claims. (Cl. 299—151)

My invention relates to improvements in fire hose couplings by which a discharge nozzle having universal movement is adapted to be coupled with a source of water under high pressure for use in quenching fire and other purposes. More particularly this invention is an improvement upon the construction disclosed in Patent Number 1,779,177, granted to me on the 21st day of October, 1930. In the patent referred to a nozzle is disclosed having universal action, that is, the discharge nozzle can be turned and directed at will independently of the hose, hydrant or other source of water supply with which it is coupled. In addition to this feature the present invention provides manually operable valve controlling means for modifying or opening and closing the supply and certain other features of improvement, cooperating with the device, all of which will be set forth in the following description.

In the accompanying drawing forming part of this specification, Fig. 1 is a side elevation of my invention; Fig. 2 is a longitudinal section in elevation of the structure shown in Fig. 1; Fig. 3 is a cross section taken on the line 3—3 of Fig. 2; Fig. 4 is a cross section of a detail taken on the line 4—4 of Fig. 2; Fig. 5 is a vertical central longitudinal section of a modified form of my improved coupling; Fig. 6 is a section of a detail taken on line 6—6 of Fig. 5, and Fig. 7 is an end elevation of a detail portion of the coupling.

In the drawing, A indicates a pipe elbow having an internally threaded water ingress end 10 and an externally threaded egress end 11. To the ingress end of said elbow is attached by threaded engagement a coupling B, of the type usually employed for quick connection with fire hose hydrants, having the usually internally threaded end 12. The connection between the coupling and elbow is preferably by finely and accurately matched threads and the coupling is kept back sufficiently from the extreme depth of said threads to allow for free swivel action after a connection is complete.

C indicates a cylindrical valve housing which is disposed with its axis at an angle to the axis of the egress end 11 of the elbow A. This housing has an open outer end 13 which is externally threaded at 14 to be coupled by threaded engagement with a hose nozzle D, a suitable angular shoulder 15 on the periphery of the housing and a washer 16, being provided to assist in producing a water tight connection between the housing and nozzle. The side of said housing has a branch 17 which is united by threaded engagement at 18 with the threaded egress end of the elbow A. Preferably this last mentioned threaded engagement is by fine accurately matched threading to produce a water tight connection, the union being kept back sufficiently from the extreme depth of the threads to allow for free swivel action between the valve housing and elbow so that an operator can by the swivel movement direct the nozzle in any desired direction around the axis of the outlet end of the union.

A suitable hollow cylindrical valve D' is closely fitted to turn freely in and about the axis of the valve housing C. This valve has an orifice 19 in its side which in one position of the rotative movement of the valve registers with the branch opening entering the egress end of the elbow A. The outer end of the valve is open to form a communication between the nozzle D and elbow. The inner end of valve D has a valve stem 20, extending freely through and revoluble in the end of the valve housing remote from the nozzle for rotating the valve into open, closed or modified position.

Two handle members E and F are provided on the valve stem, handle member E resembling a rotatable sleeve being employed to swing and direct the valve housing about the axis of the egress end of the elbow and to lock the valve in adjusted position in the valve chamber by a clamping action, and the handle F resembling a hand wheel fastened to the outer end of the stem being employed to rotate the valve. Preferably the end of the stem is externally threaded at 21 adjoining the valve housing and the sleeve handle E is threaded thereon so that screwing the handle down upon the threaded portion of the valve stem the valve can be locked against rotation in any rotatable position. While in the act of locking, the valve can be turned into opened, closed or modified position by handle member F. Suitable washers 22 are provided to produce an antileak joint between the valve and housing when the handle E is tightened. Thus member E performs the double function of directing the nozzle and locking the valve in adjusted position and handle F performs the function of facilitating the rotation of the valve when the handle E is loosened and of assisting in directing the nozzle. Handle F is secured in the valve stem by pin 23. The rotative movement of valve D' is limited by a stop pin 24 (see Fig. 3) threaded through the wall of the valve housing and suitable shoulders 25 on the cylindrical wall of the valve. Preferably the valve D' is seated in the valve housing C by inwardly tapering connection to produce antileak joint.

In use handle member E is held by one hand of the operator while the nozzle or elbow is held by the other hand. In this manner the nozzle can be freely directed in any direction desired and the valve simultaneously operated at will to open, close or modify the position of the valve and the stream of water or to lock the valve in any controlling position.

In the alternative construction shown in Figs. 5, 6 and 7, the elbow member G is at an oblique angle to provide greater freedom of movement. The nozzle directing handle member H is integral with the valve housing, thus providing a longer bearing for the valve stem I. The rotative adjustment of the valve J is by means of the handle K which is held on said stem by means of a key 30 and the washer and bolt 31 and 32, the latter being threaded in the outer end of stem I. Packing washers 33 and 34, respectively between the valve J and inner end of handle member H and between the outer end of handle H and valve adjusting handle K, produce tight joints and friction whereby the valve J will tend to remain adjusted. The tightness of joint and friction are adjusted by turning the bolt 32. The limit of turning movement of valve J is defined and limited by the transverse groove 35 and co-operating stop bolt 36 respectively in the valve stem I and nozzle directing handle H.

In accordance with the patent statutes, I have described the principles of operation of my invention together with the construction thereof which I now consider to represent the best embodiments thereof, but I desire to have it understood that the structure shown is only illustrative and that the invention can be carried out by other means and applied to uses other than those above set forth within the scope of the following claims.

Having described my invention, what I claim as new and desire to secure by Letters Patent is:

1. A universal valve controlled fire nozzle, comprising, in combination, an elbow, a hose coupling swiveled on the ingress end of said elbow, a housing forming a valve chamber open at one end and having a lateral ingress branch entering its side and swiveled on the egress end of said elbow to permit turning said housing about an axis disposed at an angle to the axis of said chamber, a nozzle detachably mounted upon the open end of said housing, a hollow valve rotatably seated in said valve chamber to turn about the axis of the latter, intercepting the passage through said elbow, having an orifice in its side adapted in one position of the valve to register with and fully open the egress end of the duct through said elbow, and having a valve stem co-axial therewith and extending through the end of said housing remote from said nozzle, and a rotatable sleeve covering substantially the entire stem throughout its length and threaded at its inner end on said stem and adapted when turned in one direction to bind towards said housing and hold said valve in modified or freely open or closed position.

2. A universal valve controlled fire hose nozzle, comprising, in combination, an elbow, a hose coupling swiveled on the ingress end of said elbow, a housing forming a valve chamber open at one end and having a lateral ingress branch entering its side and swiveled on the egress end of said elbow to permit turning said housing about an axis disposed at an angle to the axis of said chamber, a nozzle detachably mounted upon the open end of said housing, a hollow valve rotatably seated in said valve chamber to turn about the axis of the latter, intercepting the passage through said elbow, having an orifice in its side adapted in one position of the valve to register with and fully open the egress end of the duct through said elbow, and having a valve stem co-axial therewith and extending through the end of said housing remote from said nozzle, anti-leak means disposed between said stem and the wall of said housing, a handle secured on said stem by which said valve can be more easily turned and a rotatable sleeve covering substantially the entire stem throughout its length and threaded at its inner end on the stem, said sleeve being adapted when turned in one direction to bind towards said housing and hold said valve in modified or freely open or closed position.

3. A universal valve controlled fire hose nozzle, comprising, in combination, an elbow, a hose coupling threaded to swivel on the ingress end of said elbow, a housing forming a rotary valve chamber open at one end and having a lateral ingress branch entering its side and threaded to swivel on the egress end of said elbow to permit turning said housing about an axis disposed at an angle to the axis of said chamber, a nozzle detachably mounted upon the open end of said housing, a hollow plug valve rotatably seated in said valve chamber to turn about the axis of the latter, intercepting the passage through said elbow, having an orifice in its side adapted in one rotative position of the valve to register with and fully open the egress end of the duct through said elbow, and having a valve stem co-axial therewith and extending through and outwardly from the end of said housing remote from said nozzle, means on said housing for limiting the rotative movement of said valve in said valve chamber, anti-leak means adjoining said stem between said housing and said stem, a rotatable sleeve covering substantially the entire stem throughout its length and threaded at its inner end on the stem, said sleeve being adapted when turned in one direction to bind towards said housing and hold said valve in modified or freely open or closed position, and an auxiliary handle on the outer end of said stem.

JOHN R. LONG.